(12) United States Patent
Du

(10) Patent No.: US 10,931,651 B2
(45) Date of Patent: Feb. 23, 2021

(54) KEY MANAGEMENT

(71) Applicant: Advanced New Technologies Co., Ltd., Grand Cayman (KY)

(72) Inventor: Huabing Du, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/805,446

(22) Filed: Feb. 28, 2020

(65) Prior Publication Data
US 2020/0204529 A1 Jun. 25, 2020

Related U.S. Application Data

(63) Continuation of application No. PCT/CN2018/107501, filed on Sep. 26, 2018.

(30) Foreign Application Priority Data

Nov. 21, 2017 (CN) .......................... 201711168249.3

(51) Int. Cl.
*H04L 29/06* (2006.01)
*G06F 16/22* (2019.01)
(Continued)

(52) U.S. Cl.
CPC .......... *H04L 63/06* (2013.01); *G06F 16/2246* (2019.01); *G06F 21/602* (2013.01);
(Continued)

(58) Field of Classification Search
None
See application file for complete search history.

(56) References Cited

U.S. PATENT DOCUMENTS 6,240,188 B1 5/2001 Dondeti et al.
6,959,086 B2 * 10/2005 Ober .................... G06F 8/60
380/259

(Continued)

FOREIGN PATENT DOCUMENTS

CN 101257382 9/2008
CN 101263504 9/2008
(Continued)

OTHER PUBLICATIONS

Pollari-Malmi; B+-trees; 2011; Retrieved from the Internet https://web.archive.org/web/20110626161025/https://www.cs.helsinki.fi/u/mluukkai/tirak2010/B-tree.pdf; pp. 1-9, as printed. (Year: 2011).*
(Continued)

*Primary Examiner* — Saleh Najjar
*Assistant Examiner* — Michael W Chao
(74) *Attorney, Agent, or Firm* — Fish & Richardson P.C.

(57) ABSTRACT

A data encryption device obtains at least one piece of data to be encrypted. The data encryption device calculates, for each particular piece of data of the at least one piece of data, a data-specific key corresponding to the particular piece of data, the data-specific key being calculated based on a prestored root key and a data identifier of the particular piece of data using a one-way function, where the one-way function is such that the root key is not uniquely derivable from the data-specific key using the one-way function. The data encryption device generates encrypted data corresponding to the particular piece of data by encrypting the particular piece of data using the data-specific key corresponding to the piece of data.

20 Claims, 4 Drawing Sheets

(51) Int. Cl.
*H04L 9/06* (2006.01)
*H04L 9/08* (2006.01)
*G06F 21/60* (2013.01)
*H04L 9/32* (2006.01)
*G06F 21/62* (2013.01)

(52) U.S. Cl.
CPC .......... *H04L 9/0643* (2013.01); *H04L 9/0861* (2013.01); *H04L 9/3242* (2013.01); *G06F 21/6272* (2013.01); *H04L 2209/24* (2013.01); *H04L 2209/38* (2013.01)

(56) References Cited

U.S. PATENT DOCUMENTS

| | | | |
|---|---|---|---|
| 7,007,040 B1 | 2/2006 | Clifford | |
| 7,069,272 B2 | 6/2006 | Snyder | |
| 7,599,497 B2 | 10/2009 | Soppera | |
| 7,724,906 B2 | 5/2010 | Matsushita | |
| 8,161,371 B2* | 4/2012 | Baldwin | G06F 16/13 715/208 |
| 8,266,234 B1 | 9/2012 | Chapman et al. | |
| 8,307,454 B2* | 11/2012 | Fukuta | H04L 63/0272 705/51 |
| 8,386,800 B2* | 2/2013 | Kocher | H04L 9/16 713/189 |
| 8,812,874 B1 | 8/2014 | Clifford | |
| 9,207,866 B2* | 12/2015 | Boeuf | G06F 3/0683 |
| 9,432,192 B1 | 8/2016 | Pogde et al. | |
| 9,992,014 B2* | 6/2018 | McGregor, Jr. | H04L 9/0836 |
| 10,044,503 B1* | 8/2018 | Roth | H04L 63/064 |
| 10,223,544 B1* | 3/2019 | Pogde | H04L 9/0836 |
| 10,725,988 B2* | 7/2020 | Boles | G06F 16/2246 |
| 10,783,186 B2* | 9/2020 | Boles | G06F 16/22 |
| 2002/0150250 A1* | 10/2002 | Kitaya | H04L 9/0836 380/277 |
| 2003/0185396 A1* | 10/2003 | Asano | H04L 63/0428 380/277 |
| 2003/0217265 A1 | 11/2003 | Nakano et al. | |
| 2004/0255135 A1 | 12/2004 | Kitaya et al. | |
| 2005/0229257 A1* | 10/2005 | Kim | G06F 21/10 726/27 |
| 2006/0149762 A1 | 7/2006 | Suga et al. | |
| 2007/0133806 A1* | 6/2007 | Asano | H04L 9/0836 380/277 |
| 2007/0263875 A1* | 11/2007 | Kitaya | H04L 9/0891 380/279 |
| 2008/0086636 A1 | 4/2008 | Jung et al. | |
| 2010/0042842 A1* | 2/2010 | Huang | H04L 9/3236 713/176 |
| 2011/0138192 A1* | 6/2011 | Kocher | H04L 9/3247 713/189 |
| 2012/0278335 A1 | 11/2012 | Bentkofsky et al. | |
| 2013/0262862 A1* | 10/2013 | Hartley | G06F 16/178 713/165 |
| 2015/0186657 A1* | 7/2015 | Nakhjiri | H04L 9/0894 713/155 |
| 2016/0013939 A1* | 1/2016 | Jun | H04L 9/003 380/44 |
| 2016/0034507 A1 | 2/2016 | Aron et al. | |
| 2017/0187526 A1 | 6/2017 | Ferguson et al. | |
| 2017/0244679 A1* | 8/2017 | Kumar | H04L 63/06 |
| 2018/0004957 A1* | 1/2018 | Kocher | G06F 21/556 |
| 2018/0183602 A1* | 6/2018 | Campagna | H04L 9/0861 |
| 2018/0262333 A1* | 9/2018 | Kamijoh | H04L 9/14 |
| 2018/0331832 A1* | 11/2018 | Pulsifer | H04L 9/0637 |
| 2020/0145189 A1* | 5/2020 | Androulaki | H04L 9/0637 |

FOREIGN PATENT DOCUMENTS

| | | |
|---|---|---|
| CN | 101803273 | 8/2010 |
| CN | 102546151 | 7/2012 |
| CN | 102867286 | 1/2013 |
| CN | 103905187 | 7/2014 |
| CN | 104040935 | 9/2014 |
| CN | 104113408 | 10/2014 |
| CN | 105071937 | 11/2015 |
| CN | 105187202 | 12/2015 |
| CN | 105825142 | 8/2016 |
| CN | 106059768 | 10/2016 |
| CN | 106230588 | 12/2016 |
| CN | 107124271 | 9/2017 |
| CN | 108063756 | 5/2018 |
| WO | WO2014089843 | 6/2014 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2018/107501, dated Dec. 28, 2018, 9 pages (with partial English translation).

Zhu et al., "The Research of Traverse of Merkle Tree," Microcomputer Information, Jan. 2010, 26(3):182-183 (with English abstract).

Dai et al., "The pre-disctibution scheme of the key for wireless sensors networks with actors," Huazhong University of Science and Technology (Nature Science Edition), Nov. 2007, 35(11):62-65 (with English abstract).

Extended European Search Report in European Application No. 18881752.2, dated Jun. 2, 2020, 8 pages.

Hur et al., "Attribute-based access control with efficient revocation in data outsourcing systems," IEEE Transactions on Parallel and Distributed Systems, Jul. 2011, 22(7):1213-1221.

Li et al., "Research on Data Provenance's Security Model," Journal of Shandong University of Technology (Natural Science edition), Jul. 2010, 24(4):1-9 (with English abstract).

Li, "Research on ORAM Technique to Protect Data Access Pattern," Chinese Master Thesis Full-text Database, Jun. 2016, 54 pages (with English abstract).

PCT International Preliminary Report on Patentability in International Application No. PCT/CN2018/107501, dated May 26, 2020, 10 pages (with English translation).

\* cited by examiner

KEY MANAGEMENT

CROSS-REFERENCE TO RELATED APPLICATIONS

This application is a continuation of PCT Application No. PCT/CN2018/107501, filed on Sep. 26, 2018, which claims priority to Chinese Patent Application No. 201711168249.3, filed on Nov. 21, 2017, and each application is hereby incorporated by reference in its entirety.

TECHNICAL FIELD

The present specification relates to the field of information technologies, and in particular, to a key management method, apparatus, and device.

BACKGROUND

At present, it is relatively common for a data storage party to make stored data public for use by a data acquisition party. The data acquisition party can access a device of the data storage party through a network, to obtain data stored in the device.

Generally, to manage data acquisition permission, for each piece of data, the data storage party encrypts the data by using a key corresponding to the data, to obtain encrypted data corresponding to the data. Different data corresponds to different keys. If the data acquisition party wants to decrypt a certain piece of encrypted data, the data acquisition party must first request a key corresponding to the encrypted data from the data storage party, and then can decrypt the encrypted data by using the obtained key, to obtain original data.

SUMMARY

Implementations of the present specification provide a key management method, apparatus, and device, to alleviate a problem of high costs of an existing key management method.

To alleviate the technical problem, the implementations of the present specification are implemented as follows:

An implementation of the present specification provides a data encryption method, including: obtaining data to be encrypted; calculating, for each piece of data, a key corresponding to the data based on a prestored root key and a data identifier of the data by using a one-way function; and encrypting the data by using the key corresponding to the data, to obtain encrypted data corresponding to the data.

An implementation of the present specification provides a key sending method, including: receiving a data decryption request sent by a data decryption device, where the data decryption request includes a data identifier; calculating a key based on a prestored root key and the data identifier by using a one-way function; and sending the calculated key to the data decryption device, so that the data decryption device decrypts encrypted data corresponding to the data identifier included in the data decryption request based on the received key.

An implementation of the present specification provides a data decryption method, including: sending a data decryption request to a data encryption device, where the data decryption request includes a data identifier; receiving a key returned by the data encryption device, where the key is calculated by the data encryption device according to the previous data encryption method; and decrypting encrypted data corresponding to the data identifier included in the data decryption request based on the key.

An implementation of the present specification provides a data encryption apparatus, including: an acquisition module, configured to obtain data to be encrypted; a calculation module, configured to calculate, for each piece of data, a key corresponding to the data based on a prestored root key and a data identifier of the data by using a one-way function; and an encryption module, configured to encrypt the data by using the key corresponding to the data, to obtain encrypted data corresponding to the data.

An implementation of the present specification provides a key sending apparatus, including: a receiving module, configured to receive a data decryption request sent by a data decryption device, where the data decryption request includes a data identifier; a calculation module, configured to calculate a key based on a prestored root key and the data identifier by using a one-way function; and a sending module, configured to send the calculated key to the data decryption device, so that the data decryption device decrypts encrypted data corresponding to the data identifier included in the data decryption request based on the received key.

An implementation of the present specification provides a data decryption apparatus, including: a sending module, configured to send a data decryption request to a data encryption device, where the data decryption request includes a data identifier; a receiving module, configured to receive a key returned by the data encryption device, where the key is calculated by the data encryption device according to the previous data encryption method; and a decryption module, configured to decrypt encrypted data corresponding to the data identifier included in the data decryption request based on the key.

An implementation of the present specification provides a data encryption device, including one or more processors and one or more memories, where the memory stores a program, and the one or more processors are configured to perform the following steps: obtaining data to be encrypted; calculating, for each piece of data, a key corresponding to the data based on a prestored root key and a data identifier of the data by using a one-way function; and encrypting the data by using the key corresponding to the data, to obtain encrypted data corresponding to the data.

An implementation of the present specification provides a key sending device, including one or more processors and one or more memories, where the memory stores a program, and the one or more processors are configured to perform the following steps: receiving a data decryption request sent by a data decryption device, where the data decryption request includes a data identifier; calculating a key based on a prestored root key and the data identifier by using a one-way function; and sending the calculated key to the data decryption device, so that the data decryption device decrypts encrypted data corresponding to the data identifier included in the data decryption request based on the received key.

An implementation of the present specification provides a data decryption device, including one or more processors and one or more memories, where the memory stores a program, and the one or more processors are configured to perform the following steps: sending a data decryption request to a data encryption device, where the data decryption request includes a data identifier; receiving a key returned by the data encryption device, where the key is calculated by the data encryption device according to the previous data encryption method; and decrypting encrypted data corresponding to the data identifier included in the data decryption request based on the key.

It can be learned from the technical solutions provided in the previous implementations of the present specification that, in the implementations of the present specification, a key corresponding to data is calculated based on a data identifier of the data and a prestored root key by using a one-way function, and the data is encrypted by using the key corresponding to the data. When a data decryption device needs to be authorized to decrypt a certain piece of data, a key corresponding to the data is calculated based on a data identifier of the data and the root key by using the one-way function, and the key corresponding to the data is sent to the data decryption device. As such, a data encryption device does not need to store a key corresponding to each piece of data, but merely stores a root key, and the data encryption device can derive, at any time, the key corresponding to each piece of data based on the root key and a data identifier of each piece of data, which reduces storage costs of the data encryption device.

BRIEF DESCRIPTION OF DRAWINGS

To describe technical solutions in implementations of the present specification or in the existing technology more clearly, the following briefly describes the accompanying drawings needed for describing the implementations or the existing technology. Apparently, the accompanying drawings in the following descriptions merely show some implementations recorded in the present specification, and a person of ordinary skill in the art can still derive other drawings from these accompanying drawings without creative efforts.

DESCRIPTION OF IMPLEMENTATIONS

Figure 1:
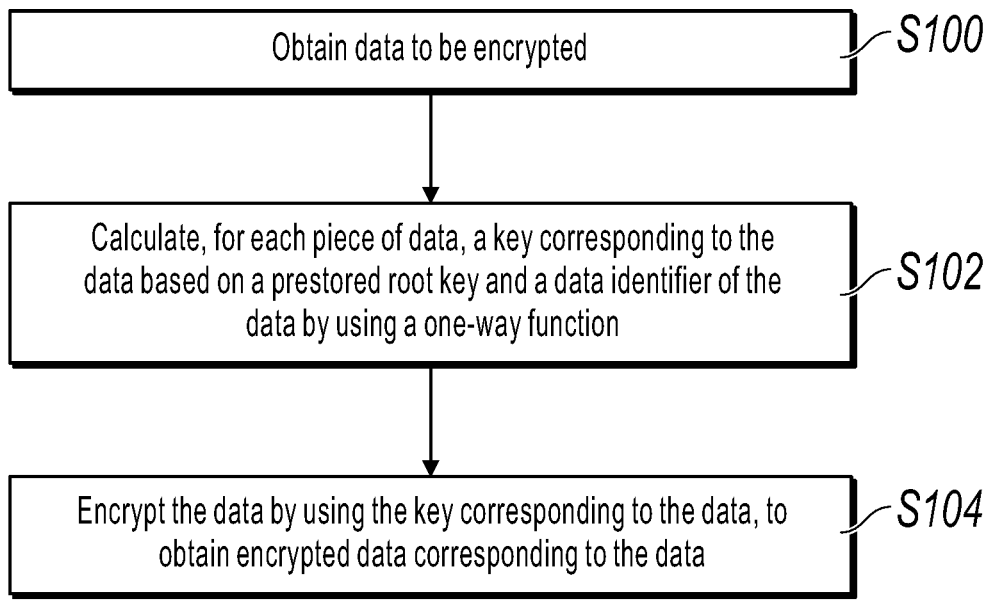
FIG. 1 is a flowchart illustrating a data encryption method, according to an implementation of the present specification.

In the existing technology, a data storage party usually encrypts different data by using different keys, and stores each piece of obtained encrypted data and a key corresponding to each piece of encrypted data. When a data decryption device sends a request for decrypting certain piece of encrypted data to a data encryption device, the data encryption device sends a key corresponding to the encrypted data to the data decryption device, so that the data decryption device can decrypt the encrypted data by using the received key, to obtain original data.

However, this mode has the following defect: As more data is stored in the data storage party, the data storage party correspondingly needs to store more keys, resulting in relatively high storage costs of the data storage party.

In one or more implementations of the present specification, a key used by the data encryption device to encrypt certain piece of data is obtained based on a data identifier of the data and a prestored root key by using a one-way function. This means the following:

1. A key corresponding to each piece of data is derived from the root key, the data encryption device only needs to store the root key, and the key corresponding to each piece of data can be derived from the root key at any time, which can significantly reduce storage costs of the data encryption device.

2. Each piece of data has a different identifier, and for the one-way function, different inputs usually result in different outputs. On this basis, because a key used to encrypt each piece of data is obtained based on the root key and a data identifier of the data by using the one-way function, different keys are needed for decrypting encrypted data.

3. Due to the irreversibility of the one-way function, a root key that a certain key is derived from cannot be reversely derived from the certain key, which can effectively prevent a device other than the data encryption device from generating a key corresponding to a certain piece of data without authorization.

It is worthwhile to note that, in the implementations of the present specification, the data storage party can encrypt data by using its own devices and then store obtained encrypted data. Alternatively, a device that does not belong to the data storage party encrypts data to obtain encrypted data, and the data storage party obtains and stores the encrypted data. Therefore, in the present specification, a device that actually encrypts data is referred to as "data encryption device", and the device may or may not be a device of the data storage party.

The implementations of the present specification relate to a key management method, and specifically, to a data encryption method, a key sending method, and a data decryption method.

To make a person skilled in the art better understand the technical solutions in the present specification, the following clearly describes the technical solutions in the implementations of the present specification with reference to the accompanying drawings in the one or more implementations of the present specification. Apparently, the described implementations are merely some rather than all of the implementations of the present specification. All other implementations obtained by a person of ordinary skill in the art by using the implementations of the present specification without creative efforts shall fall within the protection scope of the present specification.

The technical solutions provided in the implementations of the present specification are described below in detail with reference to the accompanying drawings.

FIG. 1 is a flowchart illustrating a data encryption method, according to an implementation of the present specification. The method includes the following steps:

S100. A data encryption device obtains data to be encrypted.

The method shown in FIG. 1 is executed by the data encryption device, which may be, for example, a device of a data owner, such as a computer of a file author. The data encryption device can receive data to be encrypted input by a data author, or can obtain data to be encrypted from other sources. Implementations are not specifically limited in the present specification.

S102. Calculate, for each piece of data, a key corresponding to the data based on a prestored root key and a data identifier of the data by using a one-way function.

In this implementation of the present specification, the root key is a key that needs to be stored by the encryption device, and a key used to encrypt each piece of data is derived from the root key.

To ensure that different keys are derived from the root key and data identifiers of different data, and ensure that it is difficult to reversely derive the root key based on a derived key, the following characteristics of the one-way function need to be used: (1) If different data is input to the one-way function, output data calculated by using the one-way function is also different. (2) It is difficult to reversely derive input of the one-way function from output of the one-way function. Common one-way functions, such as message digest algorithm 5 (MD5), secure hash algorithm (SHA), and message authentication code (MAC), are applicable to the implementations of the present specification.

S104. Encrypt the data by using the key corresponding to the data, to obtain encrypted data corresponding to the data.

Here, it is worthwhile to note that the previous steps S100 to S104 are method steps for encrypting data, and the data encryption device is mainly configured to encrypt each piece of data to be encrypted and deliver a key to a data decryption device that requests to decrypt data. The data encryption device unnecessarily stores each piece of obtained encrypted data.

Specifically, the data encryption device can store each piece of obtained encrypted data, and/or send each piece of obtained encrypted data to blockchain nodes, and the blockchain nodes store each piece of encrypted data in a blockchain after consensus verification of the blockchain nodes on each piece of encrypted data succeeds.

When each piece of encrypted data is stored by the data encryption device, the data decryption device can request certain piece of encrypted data and a key needed for decrypting the encrypted data from the data encryption device, and then decrypt the obtained encrypted data by using the obtained key.

When each piece of encrypted data is stored in the blockchain, the data decryption device can first request a key needed for decrypting certain piece of encrypted data from the data encryption device and then obtain the encrypted data from a certain blockchain node, and decrypt the encrypted data by using the key corresponding to the encrypted data delivered by the data encryption device, to obtain original data.

Figure 2:
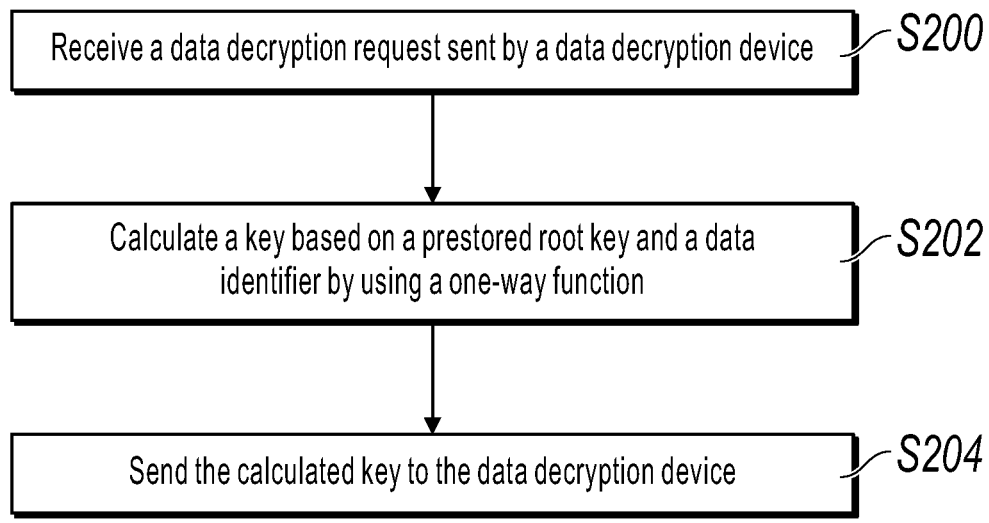
FIG. 2 is a flowchart illustrating a key sending method, according to an implementation of the present specification.

FIG. 2 is a flowchart illustrating a key sending method, according to an implementation of the present specification. The method includes the following steps:

S200. Receive a data decryption request sent by a data decryption device.

The method shown in FIG. 2 is executed by a data encryption device. As previously described, in addition to encrypting each piece of data to be encrypted (for example, performing the process shown in FIG. 1), the data encryption device is further mainly configured to deliver a key to the data decryption device that requests to decrypt data (namely, perform the process shown in FIG. 2).

The data decryption device is a device that needs a key for decrypting encrypted data, and is usually a device of a data acquisition party. Before decrypting certain piece of encrypted data, the data decryption device needs to request a key corresponding to the encrypted data from the data encryption device, which is equivalent to requesting the data encryption device to authorize the data decryption device to perform decryption.

In this implementation of the present specification, the data decryption request can include a data identifier, and the data identifier can correspond to one piece of encrypted data or one batch of encrypted data. The encrypted data corresponding to the data identifier is encrypted data that needs to be decrypted by the data decryption device.

S202. Calculate a key based on a prestored root key and the data identifier by using a one-way function.

In this implementation of the present specification, to reduce storage costs, the data encryption device does not store a key corresponding to each piece of encrypted data. Therefore, in the present step S202, the data encryption device needs to temporarily generate the key that needs to be sent.

Similar to step S102, in the present step S202, the data encryption device calculates the key that needs to be sent to the data decryption device based on the prestored root key and the data identifier included in the data decryption request by using the one-way function.

S204. Send the calculated key to the data decryption device.

Figure 3:
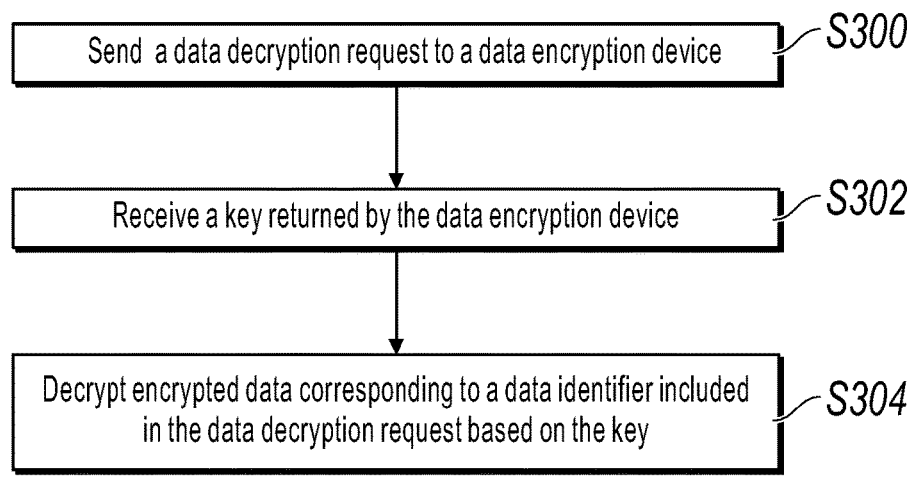
FIG. 3 is a flowchart illustrating a data decryption method, according to an implementation of the present specification.

FIG. 3 is a flowchart illustrating a data decryption method, according to an implementation of the present specification. The method includes the following steps:

S300. Send a data decryption request to a data encryption device.

The method is executed by a data decryption device. The data decryption request includes a data identifier, and encrypted data corresponding to the data identifier is encrypted data that needs to be decrypted by the data decryption device. The data decryption device can know, in advance, the data identifier corresponding to the encrypted data that needs to be decrypted by the data decryption device. For example, the data encryption device can organize data identifiers of encrypted data into a list and disclose the list, and the data decryption device searches the list to determine the data identifier of the encrypted data that needs to be decrypted by the data decryption device.

S302. Receive a key returned by the data encryption device.

In this implementation of the present specification, the key returned by the data encryption device is calculated by the data encryption device in step S202 shown in FIG. 2.

S304. Decrypt the encrypted data corresponding to the data identifier included in the data decryption request based on the key.

As previously described, in this implementation of the present specification, a key corresponding to each piece of encrypted data is managed by the data encryption device, but where each piece of encrypted data is stored is not specifically limited. The data encryption device can store encrypted data, and devices (even including the data decryption device) other than the data encryption device can also store encrypted data. Correspondingly, the data decryption device can obtain the encrypted data corresponding to the data identifier from the data encryption device, or can obtain the encrypted data corresponding to the data identifier from other devices (such as block chain nodes), or can even prestore each piece of encrypted data.

The data decryption device obtains the key sent by the data encryption device, which means that the data decryption device is authorized to decrypt the encrypted data corresponding to the data identifier.

According to the key management method shown in FIG. 1 to FIG. 3, different keys are needed for decrypting different encrypted data. The data decryption device cannot reversely derive the root key based on an obtained key corresponding to certain piece of data, and therefore cannot privately derive a key corresponding to other data, but merely can request a decryption permission from the data encryption device. The data encryption device that manages a key does not need to store a key corresponding to each piece of data, but merely stores a root key, and the data encryption device can derive, at any time, the key corresponding to each piece of data based on the root key and a data identifier of each piece of data, which reduces storage costs of the data encryption device.

In addition, the previous technical solutions are further extended below.

Figure 4:
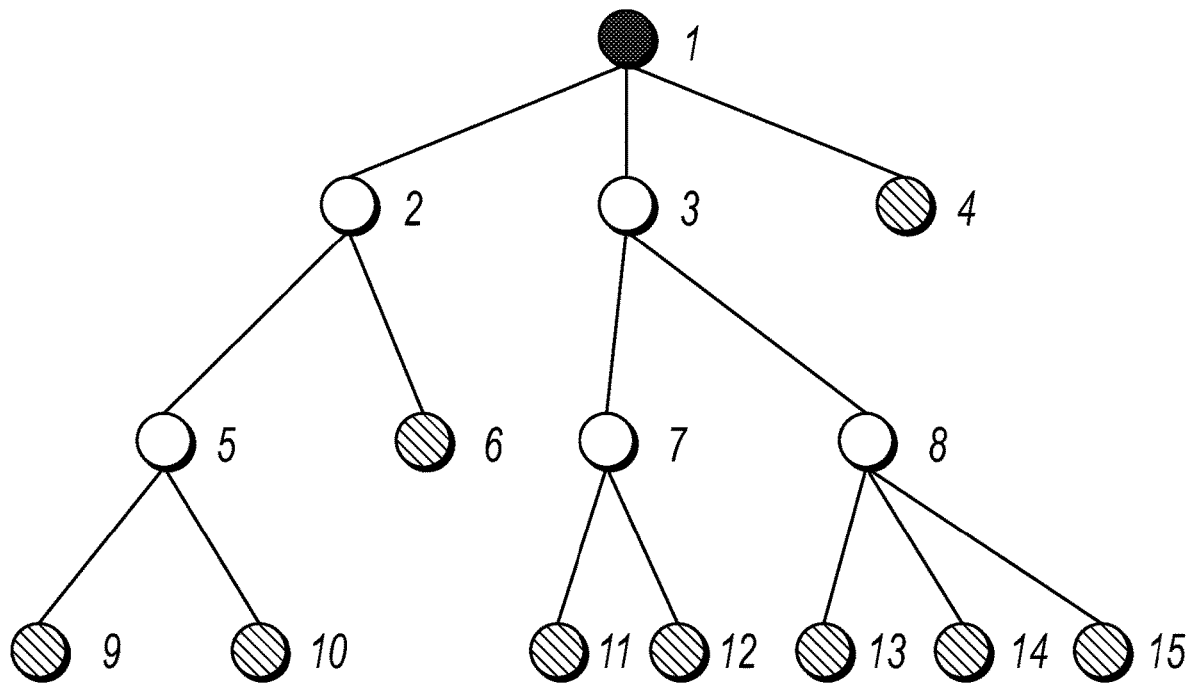
FIG. 4 is a schematic diagram illustrating a tree structure, according to an implementation of the present specification.

FIG. 4 is a schematic diagram illustrating a tree structure, according to an implementation of the present specification. As shown in FIG. 4, in the tree structure, a solid dot represents a root node, a hollow dot represents an intermediate node, and a shaded dot represents a leaf node.

In the tree structure, a number is assigned to each node, which can conveniently represent a path between any two nodes that have a parent-child relationship in the tree structure. Assume that any node of the tree structure is a first node and any node under the first node is a second node, in the present specification, path information of the second node relative to the first node is actually a sequence of all nodes from the first node to the second node.

For example, path information of node 5 relative to node 1 may be a sequence "1-2-5", and path information of node 15 relative to node 1 may be sequence "1-3-8-15".

In this implementation of the present specification, leaf nodes of the tree structure can be enabled to be in a one-to-one correspondence with data to be encrypted. Certainly, encrypted data obtained after the data is encrypted is also in a one-to-one correspondence with all the leaf nodes. Based on such setting, for each piece of data, path information of a leaf node corresponding to the data relative to the root node of the tree structure can be used as a data identifier of the data. It is worthwhile to note that the encrypted data is in one-to-one correspondence with all the leaf nodes, which does not mean that the encrypted data must be stored based on the tree structure. A storage form of the encrypted data is not specifically limited in the present specification.

If the data and the encrypted data corresponding to the data are in one-to-one correspondence with all the leaf nodes, the technical solutions can be extended as follows: In step S102 in the method shown in FIG. 1, for each piece of data, based on the prestored root key and path information of a leaf node corresponding to the data relative to the root node, a key corresponding to the leaf node can be calculated by using the one-way function, and the key corresponding to the leaf node can be used as a key corresponding to the data.

In the key sending method shown in FIG. 2, the data identifier included in the data decryption request can be path information of a leaf node corresponding to the encrypted data that the data decryption device wants to decrypt relative to the root node of the tree structure, and the data encryption device can also calculate the key corresponding to the encrypted data to be decrypted by using the method in step S102, and send the calculated key to the data decryption device.

In the data decryption method shown in FIG. 3, the data identifier included in the data decryption request sent by the data decryption device can be path information of a leaf node relative to the root node, and the data decryption device can decrypt the encrypted data corresponding to the data identifier included in the data decryption request by using the received key.

Based on the tree structure shown in FIG. 4, this implementation of the specification provides a method (referred to as "node key algorithm" below) for calculating a key corresponding to the second node by using the one-way function, based on a key corresponding to the first node and the path information of the second node relative to the first node. The method is as follows: The root key is a key corresponding to the root node; the first node is used as an input node; the key corresponding to the input node and path information of a next node of the input node in the sequence relative to the input node are input to the one-way function, to calculate a key corresponding to the next node; whether the next node is the second node is determined; in response to determining that the next node is the second node, the calculated key is used as the key corresponding to the second node; and in response to determining that the next node is the second node, the next node is used as a new input node to continue to calculate a key corresponding to a next node of the input node in the sequence until the key corresponding to the second node is obtained.

For example, the first node is a node 3 and the second node is node 15. A key corresponding to node 3 is known. First, node 3 is used as an input node, and the key corresponding to node 3 and path information "3-8" of next node 8 of node 3 in a sequence "3-8-15" relative to node 3 are input to the one-way function, to calculate a key corresponding to node 8. Because node 8 is not node 15, node 8 is used as a new input node to continue to calculate a key corresponding to next node 15 of node 8, and finally, the key corresponding to node 15 is calculated. As such, each node (including the root node, the intermediate node, and the leaf node) of the tree structure shown in FIG. 4 can have a corresponding key.

Based on the previous node key algorithm, the technical solutions can be further extended as follows: In the process shown in FIG. 1, the root node and path information of a leaf node corresponding to certain piece of data relative to the root node are known, and a key corresponding to the leaf node corresponding to the data, namely, a key corresponding to the data, can be calculated by means of the previous node key algorithm.

Specifically, in step S102, for each piece of data, path information of a leaf node corresponding to the data relative to the root node is actually a sequence of all nodes from the root node to the leaf node, and the root key is a key corresponding to the root node of the tree structure. The calculating, based on the prestored root key and path information of a leaf node corresponding to the data relative to the root node, a key corresponding to the leaf node by using the one-way function includes: using the root node as an input node; inputting the key corresponding to the input node and path information of a next node of the input node in the sequence relative to the input node to the one-way function, to calculate a key corresponding to the next node; determining whether the next node is the leaf node; in response to determining that the next node is the leaf node, using the calculated key as the key corresponding to the leaf node; and in response to determining that the next node is not the leaf node, using the next node as a new input node to continue to calculate a key corresponding to a next node of the input node in the sequence until the key corresponding to the leaf node is obtained.

In the process shown in FIG. 2, the data identifier included in the data decryption request received by the data encryption device is not necessarily path information of a certain leaf node relative to the root node, but may be path information of a certain intermediate node of the tree structure relative to the root node. For the data encryption device, regardless of a type of node (an intermediate node or a leaf node) whose path information relative to the root node is the data identifier included in the data decryption request received by the data encryption device, the data encryption device can calculate a key corresponding to the node by means of the previous node key algorithm and send the key corresponding to the node to the data decryption device.

Specifically, in step S202, for any node of the tree structure, path information of the node relative to the root node of the tree structure is a sequence of all nodes from the root node to the node, and the root key is a key corresponding to the root node.

A method for calculating the key based on the prestored root key and the data identifier by using the one-way function can be as follows: determining a sequence based on the path information included in the data decryption request; using the root node as an input node; inputting the key corresponding to the input node and path information of a next node of the input node in the sequence relative to the input node to the one-way function, to calculate a key corresponding to the next node; determining whether the next node is the last node in the sequence; in response to determining that the next node is the last node in the sequence, using the calculated key as a key to be sent to the data decryption device; and in response to determining that the next node is not the last node in the sequence, using the next node as a new input node to continue to calculate a key corresponding to a next node of the input node in the sequence until a key corresponding to the last node in the sequence is obtained.

In the process shown in FIG. 3, the data identifier included in the data decryption request sent by the data decryption device to the data encryption device may be path information of a certain leaf node of the tree structure relative to the root node, or may be path information of a certain intermediate node relative to the root node. The tree structure is publicly known, and therefore the data decryption device can determine a path between nodes and encrypted data corresponding to each piece of leaf node.

When the data decryption request includes path information of a certain intermediate node relative to the root node, it is equivalent that the data decryption device requests the data encryption device to authorize the data decryption device to decrypt encrypted data corresponding to all leaf nodes under the intermediate node. Correspondingly, a key returned by the data encryption device to the data decryption device is a key corresponding to the intermediate node.

The data decryption device can calculate a key corresponding to any leaf node under the intermediate node based on the key corresponding to the intermediate node sent by the data encryption device by means of the node key algorithm, and therefore the data decryption device can decrypt encrypted data corresponding to any leaf node under the intermediate node.

Specifically, in step S304, for any leaf node under the intermediate node, path information of the leaf node relative to the intermediate node is a sequence of all nodes from the intermediate node to the leaf node; and the data decryption device can use the following method to calculate a key corresponding to the leaf node based on the path information of the leaf node relative to the intermediate node, and the received key by using the one-way function: determining, for each leaf node under the intermediate node corresponding to the data identifier, a sequence based on path information of the leaf node relative to the intermediate node; using the intermediate node as an input node; inputting the key corresponding to the input node and path information of a next node of the input node in the sequence relative to the input node to the one-way function, to calculate a key corresponding to the next node; determining whether the next node is the last node in the sequence; in response to determining that the next node is the last node in the sequence, using the calculated key as a key corresponding to the leaf node; and in response to determining that the next node is not the last node in the sequence, using the next node as a new input node to continue to calculate a key corresponding to a next node of the input node in the sequence until a key corresponding to the last node in the sequence is obtained.

The implementations of the present specification are extended above, so that the data encryption device can more flexibly authorize the data decryption device to decrypt encrypted data, that is, by sending a key corresponding to an intermediate node to the data decryption device, the data decryption device is authorized to decrypt the encrypted data corresponding to all leaf nodes under the intermediate node at one time.

Figure 5:
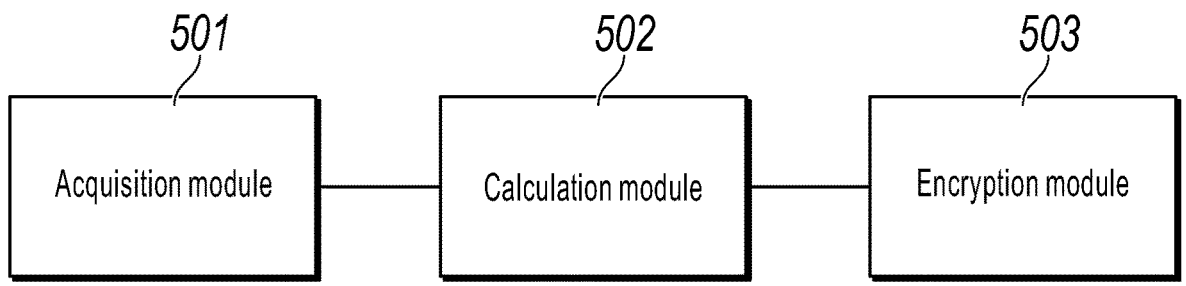
FIG. 5 is a schematic diagram illustrating a data encryption apparatus, according to an implementation of the present specification.

Based on the data encryption method shown in FIG. 1, an implementation of the present specification correspondingly provides a data encryption apparatus. As shown in FIG. 5, the apparatus includes: acquisition module 501, configured to obtain data to be encrypted; calculation module 502, configured to calculate, for each piece of data, a key corresponding to the data based on a prestored root key and a data identifier of the data by using a one-way function; and encryption module 503, configured to encrypt the data by using the key corresponding to the data, to obtain encrypted data corresponding to the data.

The data is in a one-to-one correspondence with all leaf nodes of a predetermined tree structure; for each piece of data, a data identifier of the data is path information of a leaf node corresponding to the data relative to a root node of the tree structure; and calculation module 502 is configured to calculate, for each piece of data based on the prestored root key and path information of a leaf node corresponding to the data relative to the root node, a key corresponding to the leaf node by using the one-way function, and use the key corresponding to the leaf node as a key corresponding to the data.

The path information of the leaf node corresponding to the data relative to the root node is a sequence of all nodes from the root node to the leaf node, and the root key is a key corresponding to the root node; and calculation module 502 is configured to use the root node as an input node; input the key corresponding to the input node and path information of a next node of the input node in the sequence relative to the input node to the one-way function, to calculate a key corresponding to the next node; determine whether the next node is the leaf node; in response to determining that the next node is the leaf node, use the calculated key as the key corresponding to the leaf node; and in response to determining that the next node is not the leaf node, use the next node as a new input node to continue to calculate a key corresponding to a next node of the input node in the sequence until the key corresponding to the leaf node is obtained.

Figure 6:
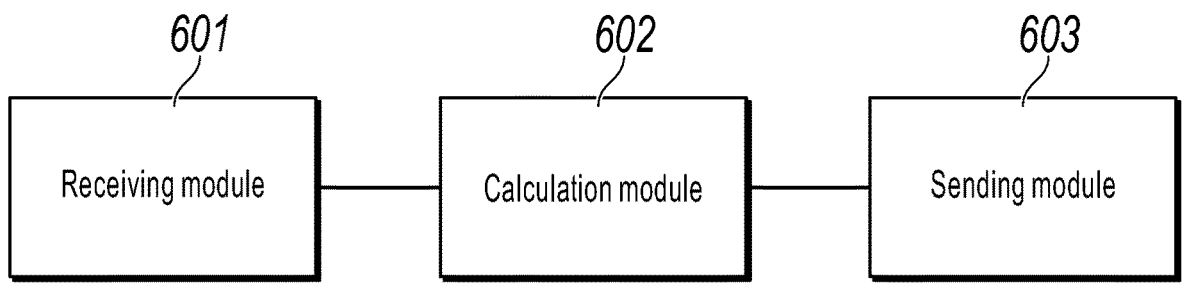
FIG. 6 is a schematic diagram illustrating a key sending apparatus, according to an implementation of the present specification.

Based on the key sending method shown in FIG. 2, an implementation of the present specification correspondingly provides a key sending apparatus. As shown in FIG. 6, the apparatus includes: receiving module 601, configured to receive a data decryption request sent by a data decryption device, where the data decryption request includes a data identifier; calculation module 602, configured to calculate a key based on a prestored root key and the data identifier by using a one-way function; and sending module 603, configured to send the calculated key to the data decryption device, so that the data decryption device decrypts encrypted data corresponding to the data identifier included in the data decryption request based on the received key.

Encrypted data is in a one-to-one correspondence with all leaf nodes of a predetermined tree structure; and the data identifier included in the data decryption request is path information of any node of the tree structure relative to a root node of the tree structure.

For any node of the tree structure, path information of the node relative to the root node of the tree structure is a sequence of all nodes from the root node to the node, and the root key is a key corresponding to the root node; and calculation module 602 is configured to determine a sequence based on the path information included in the data decryption request; use the root node as an input node; input the key corresponding to the input node and path information of a next node of the input node in the sequence relative to the input node to the one-way function, to calculate a key corresponding to the next node; determine whether the next node is the last node in the sequence; in response to determining that the next node is the last node in the sequence, use the calculated key as a key to be sent to the data decryption device; and in response to determining that the next node is not the last node in the sequence, use the next node as a new input node to continue to calculate a key corresponding to a next node of the input node in the sequence until a key corresponding to the last node in the sequence is obtained.

Figure 7:
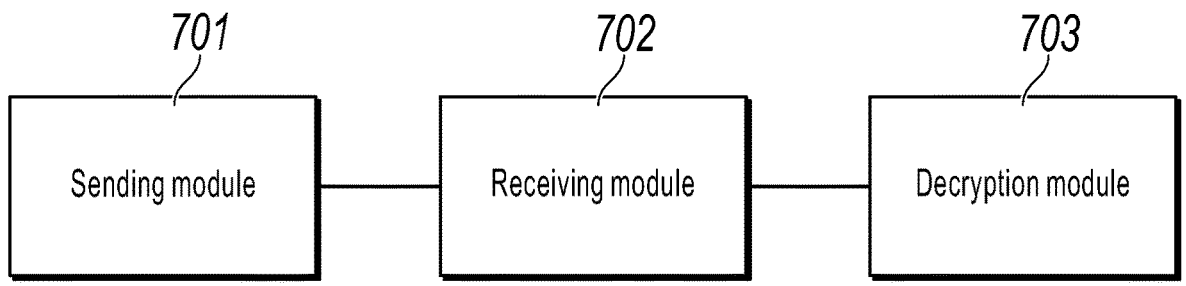
FIG. 7 is a schematic diagram illustrating a data decryption apparatus, according to an implementation of the present specification.

Based on the data decryption method shown in FIG. 3, an implementation of the present specification correspondingly provides a data decryption apparatus. As shown in FIG. 7, the apparatus includes: sending module 701, configured to send a data decryption request to a data encryption device, where the data decryption request includes a data identifier; receiving module 702, configured to receive a key returned by the data encryption device, where the key is calculated by the data encryption device according to the method according to any one of claims 4 to 6; and decryption module 703, configured to decrypt encrypted data corresponding to the data identifier included in the data decryption request based on the key.

Encrypted data is in a one-to-one correspondence with all leaf nodes of a predetermined tree structure; the data identifier included in the data decryption request is path information of any node of the tree structure relative to a root node of the tree structure; and decryption module 703 is configured to: in response to determining that the data identifier is path information of a leaf node relative to the root node, decrypt the encrypted data corresponding to the data identifier included in the data decryption request by using the key; or in response to determining that the data identifier is path information of an intermediate node relative to the root node, calculate, for each leaf node under the intermediate node, a key corresponding to the leaf node based on path information of the leaf node relative to the intermediate node and the received key by using an one-way function, and decrypt encrypted data corresponding to the leaf node by using the key corresponding to the leaf node.

For any leaf node under the intermediate node, path information of the leaf node relative to the intermediate node is a sequence of all nodes from the intermediate node to the leaf node; and decryption module 703 is configured to determine, for each leaf node under the intermediate node corresponding to the data identifier, a sequence based on path information of the leaf node relative to the intermediate node; use the intermediate node as an input node; input the key corresponding to the input node and path information of a next node of the input node in the sequence relative to the input node to the one-way function, to calculate a key corresponding to the next node; determine whether the next node is the last node in the sequence; in response to determining that the next node is the last node in the sequence, use the calculated key as a key corresponding to the leaf node; and in response to determining that the next node is not the last node in the sequence, use the next node as a new input node to continue to calculate a key corresponding to a next node of the input node in the sequence until a key corresponding to the last node in the sequence is obtained.

Figure 8:
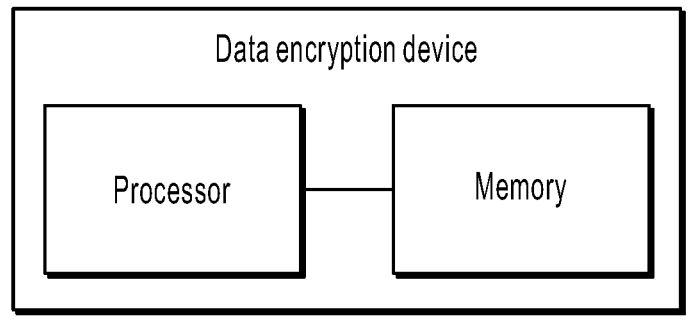
FIG. 8 is a schematic diagram illustrating a data encryption device, according to an implementation of the present specification.

FIG. 8 shows a data encryption device provided in an implementation of the present specification, including one or more processors and one or more memories, where the memory stores a program, and the one or more processors are configured to perform the following steps: obtaining data to be encrypted; calculating, for each piece of data, a key corresponding to the data based on a prestored root key and a data identifier of the data by using a one-way function; and encrypting the data by using the key corresponding to the data, to obtain encrypted data corresponding to the data.

Figure 9:
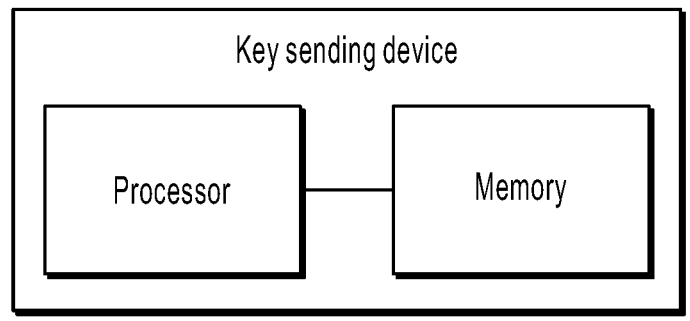
FIG. 9 is a schematic diagram illustrating a key sending device, according to an implementation of the present specification.

FIG. 9 shows a key sending device provided in an implementation of the present specification, including one or more processors and one or more memories, where the memory stores a program, and the one or more processors are configured to perform the following steps: receiving a data decryption request sent by a data decryption device, where the data decryption request includes a data identifier; calculating a key based on a prestored root key and the data identifier by using a one-way function; and sending the calculated key to the data decryption device, so that the data decryption device decrypts encrypted data corresponding to the data identifier included in the data decryption request based on the received key.

Figure 10:
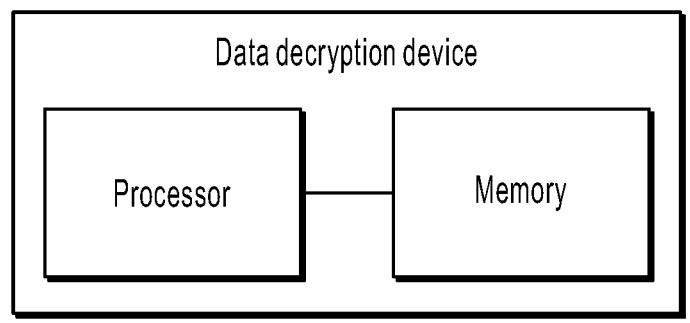
FIG. 10 is a schematic diagram illustrating a data decryption device, according to an implementation of the present specification.

FIG. 10 shows a data decryption device provided in an implementation of the present specification, including one or more processors and one or more memories, where the memory stores a program, and the one or more processors are configured to perform the following steps: sending a data decryption request to a data encryption device, where the data decryption request includes a data identifier; receiving a key returned by the data encryption device, where the key is calculated by the data encryption device according to the previous data encryption method; and decrypting encrypted data corresponding to the data identifier included in the data decryption request based on the key.

The implementations in the present specification are described in a progressive way. For same or similar parts of the implementations, mutual references can be made to the implementations. Each implementation focuses on a difference from other implementations. Especially, the devices shown in FIG. 8, FIG. 9, and FIG. 10 are basically similar to the method implementations, and therefore are described briefly. For related parts, references can be made to some descriptions in the method implementations.

In the 1990s, whether a technical improvement is a hardware improvement (for example, an improvement to circuit structures, such as a diode, a transistor, or a switch) or a software improvement (an improvement to a method process) can be clearly distinguished. However, as technologies develop, current improvements to many method processes can be considered as direct improvements to hardware circuit structures. Almost all designers program an improved method process into a hardware circuit, to obtain a corresponding hardware circuit structure. Therefore, a method process can be improved by using a hardware entity module. For example, a programmable logic device (PLD) (for example, a field programmable gate array (FPGA)) is such an integrated circuit, and a logical function of the PLD is determined by a user through device programming. A designer "integrates" a digital system to a single PLD through self-programming, without requiring a chip manufacturer to design and manufacture a dedicated integrated circuit chip. In addition, at present, instead of manually manufacturing an integrated circuit chip, such programming is mostly implemented by using "logic compiler" software. The logic compiler software is similar to a software compiler used to develop and write a program. Original code needs to be written in a particular programming language before being compiled. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). At present, the Very-High-Speed Integrated Circuit Hardware Description Language (VHDL) and Verilog are most commonly used. A person skilled in the art should also understand that a hardware circuit that implements a logical method process can be readily obtained provided that the method process is logically programmed by using several of the previously described hardware description languages and is programmed into an integrated circuit.

A controller can be implemented in any appropriate way. For example, the controller can be in a form of a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or a built-in microcontroller. Examples of the controller include but are not limited to the following microcontrollers: ARC 625D, Atmel AT91SAM, Microchip PIC18F26K20, and Silicone Labs C8051F320. A memory controller can be further implemented as a part of control logic of a memory. A person skilled in the art also knows that, in addition to implementing the controller by using the computer-readable program code, method steps can be logically programmed to enable the controller to implement the same function in forms of a logic gate, a switch, an application-specific integrated circuit, a programmable logic controller, and a built-in microcontroller. Therefore, such a controller can be considered as a hardware component, and an apparatus that is included in the controller and configured to implement various functions can also be considered as a structure in the hardware component. Alternatively, the apparatus configured to implement various functions can even be considered as both a software module implementing a method and a structure in the hardware component.

The system, apparatus, module, or unit illustrated in the previous implementations can be specifically implemented by using a computer chip or an entity, or can be implemented by using a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the previous apparatus is divided to various units based on functions for description when the previous apparatus is described. Certainly, when the present specification is implemented, functions of the units can be implemented in one or more pieces of software and/or hardware.

A person skilled in the art should understand that the implementations of the present disclosure can be provided as a method, a system, or a computer program product. Therefore, the present invention can use a form of hardware only implementations, software only implementations, or implementations with a combination of software and hardware. In addition, the present invention can use a form of a computer program product that is implemented on one or more computer-usable storage media (including but not limited to a magnetic disk memory, a CD-ROM, an optical memory, etc.) that include computer-usable program code.

The present invention is described with reference to the flowcharts and/or block diagrams of the method, the device (system), and the computer program product according to the implementations of the present invention. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of other programmable data processing devices to generate a machine, so that the instructions executed by the computer or the processor of other programmable data processing devices generate an apparatus for implementing a specified function in one or more processes in the flowcharts and/or in one or more blocks in the block diagrams.

Alternatively, these computer program instructions can be stored in a computer-readable memory that can instruct the computer or other programmable data processing devices to work in a specific way, so that the instructions stored in the computer-readable memory generate an artifact that includes an instruction apparatus. The instruction apparatus implements a specified function in one or more processes in the flowcharts and/or in one or more blocks in the block diagrams.

Alternatively, these computer program instructions can be loaded onto the computer or other programmable data processing devices, so that a series of operations and steps are performed on the computer or other programmable devices, thereby generating computer-implemented processing. Therefore, the instructions executed on the computer or another programmable device provide steps for implementing a specified function in one or more processes in the flowcharts and/or in one or more blocks in the block diagrams.

In a typical configuration, a computing device includes one or more processors (CPUs), input/output interfaces, network interfaces, and memories.

The memory may include a non-persistent memory, a random access memory (RAM), a nonvolatile memory, and/or another form in a computer-readable medium, for example, a read-only memory (ROM) or a flash memory (flash RAM). The memory is an example of the computer-readable medium.

The computer-readable medium includes persistent, non-persistent, movable, and unmovable media that can store information by using any method or technology. The information can be a computer-readable instruction, a data structure, a program module, or other data. Examples of the computer storage medium include but are not limited to a phase-change memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage or another magnetic storage device, or any other non-transmission medium. The computer storage medium can be configured to store information accessible to a computing device. As described in the present specification, the computer-readable medium does not include computer-readable transitory media such as a modulated data signal and a carrier.

It is worthwhile to further note that, the terms "comprise" and "include", or any other variants thereof are intended to cover a non-exclusive inclusion, so that a process, method, product, or device that includes a list of elements not only includes those elements but also includes other elements that are not expressly listed, or further includes elements inherent to such process, method, product, or device. Without more constraints, an element preceded by "includes a . . . " does not preclude the existence of additional identical elements in the process, method, product, or device that includes the element.

A person skilled in the art should understand that the implementations of the present specification can be provided as a method, a system, or a computer program product. Therefore, the present specification can use a form of hardware only implementations, software only implementations, or implementations with a combination of software and hardware. In addition, the present specification can use a form of a computer program product that is implemented on one or more computer-usable storage media (including but not limited to a magnetic disk memory, a CD-ROM, an optical memory, etc.) that include computer-usable program code.

The present specification can be described in the general context of a computer executable instruction executed by a computer, for example, a program module. Generally, the program module includes a routine, a program, an object, a component, a data structure, etc. executing a specific task or implementing a specific abstract data type. The present specification can also be practiced in distributed computing environments. In the distributed computing environments, tasks are performed by remote processing devices connected through a communications network. In a distributed computing environment, the program module can be located in both local and remote computer storage media including storage devices.

The previous descriptions are merely implementations of the present specification, and are not intended to limit the present specification. A person skilled in the art can make various modifications and changes to the present specification. Any modification, equivalent replacement, improvement, etc. made without departing from the spirit and principle of the present specification shall fall within the scope of the claims of the present specification.

What is claimed is:

1. A computer-implemented data encryption method, comprising:
   obtaining, by a data encryption device, at least one piece of data to be encrypted;
   calculating, by the data encryption device, for each particular piece of data of the at least one piece of data, a data-specific key corresponding to the particular piece of data, the data-specific key being calculated based on a prestored root key and a data identifier of the particular piece of data using a one-way function, wherein:
      the one-way function is such that the root key is not uniquely derivable from the data-specific key using the one-way function,
      the particular piece of data corresponds to a particular node of a predetermined tree structure,
      the data identifier of the particular piece of data represents a path between the particular node and a root node of the predetermined tree structure,
      the path comprises a plurality of path segments,
      the data-specific key is calculated based on one or more keys that are different from the root key, each key of the one or more keys being calculated based on a corresponding different path segment of the plurality of path segments, the path segment connecting a corresponding node of the path segment to its parent node; and
   generating, by the data encryption device, encrypted data corresponding to the particular piece of data by encrypting the particular piece of data using the data-specific key corresponding to the piece of data.

2. The method according to claim 1, wherein:
   the particular piece of data corresponds to a leaf node of the predetermined tree structure; and
   wherein calculating the data-specific key comprises:
      calculating, based on the prestored root key and the path, a key corresponding to the leaf node by using the one-way function; and
      setting the key corresponding to the leaf node as the data-specific key.

3. The method according to claim 2, wherein:
   the path corresponds to a sequence of all nodes from the root node to the leaf node;
   the prestored root key corresponds to the root node; and
   calculating the key corresponding to the leaf node further comprises:
      setting the root node as an input node;
      calculating, by inputting a key corresponding to the input node and path information of a path between a next node and the input node to the one-way function, a key corresponding to the next node, the next node being adjacent to the input node in the sequence of all nodes;
      determining whether the next node is the leaf node; and
      in response to determining that the next node is the leaf node, setting the key corresponding to the next node as the key corresponding to the leaf node.

4. The method according to claim 3, wherein calculating the key corresponding to the leaf node further comprises:
in response to determining that the next node is not the leaf node:
setting the next node as a new input node; and
continuing to calculate a key corresponding to a new next node until the key corresponding to the leaf node is obtained, the new next node being adjacent to the new input node in the sequence of all nodes.

5. The method according to claim 1, comprising:
receiving a data decryption request from a data decryption device, wherein the data decryption request comprises the data identifier;
calculating the data-specific key based on the prestored root key and the data identifier by using the one-way function; and
sending the data-specific key to the data decryption device, wherein the data decryption device decrypts the encrypted data corresponding to the data identifier based on the data-specific key.

6. The method according to claim 5, wherein the encrypted data corresponds to a leaf node of the predetermined tree structure.

7. The method according to claim 6, wherein:
the path corresponds to a sequence of all nodes from the root node to the leaf node;
the prestored root key corresponds to the root node; and
calculating the data-specific key comprises:
determining the sequence of all nodes based on the path;
setting the root node as an input node;
calculating, by inputting a key corresponding to the input node and path information of a path between a next node and the input node to the one-way function, a key corresponding to the next node, the next node being adjacent to the input node in the sequence of all nodes;
determining that the next node is the last node in the sequence of all nodes; and
in response to determining that the next node is the last node in the sequence of all nodes, setting the data-specific key as the key corresponding to the next node.

8. A non-transitory, computer-readable medium storing a plurality of instructions executable by a computer system to perform operations comprising:
obtaining, by a data encryption device, at least one piece of data to be encrypted;
calculating, by the data encryption device, for each particular piece of data of the at least one piece of data, a data-specific key corresponding to the particular piece of data, the data-specific key being calculated based on a prestored root key and a data identifier of the particular piece of data using a one-way function, wherein:
the one-way function is such that the root key is not uniquely derivable from the data-specific key using the one-way function,
the particular piece of data corresponds to a particular node of a predetermined tree structure,
the data identifier of the particular piece of data represents a path between the particular node and a root node of the predetermined tree structure,
the path comprises a plurality of path segments,
the data-specific key is calculated based on one or more keys that are different from the root key, each key of the one or more keys being calculated based on a corresponding different path segment of the plurality of path segments, the path segment connecting a corresponding node of the path segment to its parent node; and
generating, by the data encryption device, encrypted data corresponding to the particular piece of data by encrypting the particular piece of data using the data-specific key corresponding to the piece of data.

9. The non-transitory, computer-readable medium according to claim 8, wherein:
the particular piece of data corresponds to a leaf node of the predetermined tree structure;
and
wherein calculating the data-specific key comprises:
calculating, based on the prestored root key and the path, a key corresponding to the leaf node by using the one-way function; and
setting the key corresponding to the leaf node as the data-specific key.

10. The non-transitory, computer-readable medium according to claim 9, wherein:
the path corresponds to a sequence of all nodes from the root node to the leaf node;
the prestored root key corresponds to the root node; and
calculating the key corresponding to the leaf node further comprises:
setting the root node as an input node;
calculating, by inputting a key corresponding to the input node and path information of a path between a next node and the input node to the one-way function, a key corresponding to the next node, the next node being adjacent to the input node in the sequence of all nodes;
determining whether the next node is the leaf node; and
in response to determining that the next node is the leaf node, setting the key corresponding to the next node as the key corresponding to the leaf node.

11. The non-transitory, computer-readable medium according to claim 10, wherein calculating the key corresponding to the leaf node further comprises:
in response to determining that the next node is not the leaf node:
setting the next node as a new input node; and
continuing to calculate a key corresponding to a new next node until the key corresponding to the leaf node is obtained, the new next node being adjacent to the new input node in the sequence of all nodes.

12. The non-transitory, computer-readable medium according to claim 8, comprising:
receiving a data decryption request from a data decryption device, wherein the data decryption request comprises the data identifier;
calculating the data-specific key based on the prestored root key and the data identifier by using the one-way function; and
sending the data-specific key to the data decryption device, wherein the data decryption device decrypts the encrypted data corresponding to the data identifier based on the data-specific key.

13. The non-transitory, computer-readable medium according to claim 12, wherein the encrypted data corresponds to a leaf node of the predetermined tree structure.

14. The non-transitory, computer-readable medium according to claim 13, wherein:
the path corresponds to a sequence of all nodes from the root node to the leaf node;
the prestored root key corresponds to the root node; and
calculating the data-specific key comprises:

determining the sequence of all nodes based on the path;

setting the root node as an input node;

calculating, by inputting a key corresponding to the input node and path information of a path between a next node and the input node to the one-way function, a key corresponding to the next node, the next node being adjacent to the input node in the sequence of all nodes;

determining that the next node is the last node in the sequence of all nodes; and in response to determining that the next node is the last node in the sequence of all nodes, setting the data-specific key as the key corresponding to the next node.

15. A computer-implemented system, comprising:

one or more computers; and one or more computer memory devices interoperably coupled with the one or more computers and having tangible, non-transitory, machine-readable media storing a plurality of instructions that, when executed by the one or more computers, perform one or more operations comprising:

obtaining, by a data encryption device, at least one piece of data to be encrypted;

calculating, by the data encryption device, for each particular piece of data of the at least one piece of data, a data-specific key corresponding to the particular piece of data, the data-specific key being calculated based on a prestored root key and a data identifier of the particular piece of data using a one-way function, wherein:

the one-way function is such that the root key is not uniquely derivable from the data-specific key using the one-way function, the particular piece of data corresponds to a particular node of a predetermined tree structure, the data identifier of the particular piece of data represents a path between the particular node and a root node of the predetermined tree structure, the path comprises a plurality of path segments, the data-specific key is calculated based on one or more keys that are different from the root key, each key of the one or more keys being calculated based on a corresponding different path segment of the plurality of path segments, the path segment connecting a corresponding node of the path segment to its parent node; and generating, by the data encryption device, encrypted data corresponding to the particular piece of data by encrypting the particular piece of data using the data-specific key corresponding to the piece of data.

16. The computer-implemented system according to claim 15, wherein:

the particular piece of data corresponds to a leaf node of the predetermined tree structure; and wherein calculating the data-specific key comprises:

calculating, based on the prestored root key and the path, a key corresponding to the leaf node by using the one-way function; and setting the key corresponding to the leaf node as the data-specific key.

17. The computer-implemented system according to claim 16, wherein:

the path corresponds to a sequence of all nodes from the root node to the leaf node;

the prestored root key corresponds to the root node; and calculating the key corresponding to the leaf node further comprises:

setting the root node as an input node;

calculating, by inputting a key corresponding to the input node and path information of a path between a next node and the input node to the one-way function, a key corresponding to the next node, the next node being adjacent to the input node in the sequence of all nodes;

determining whether the next node is the leaf node; and in response to determining that the next node is the leaf node, setting the key corresponding to the next node as the key corresponding to the leaf node.

18. The computer-implemented system according to claim 17, wherein calculating the key corresponding to the leaf node further comprises:

in response to determining that the next node is not the leaf node:

setting the next node as a new input node; and continuing to calculate a key corresponding to a new next node until the key corresponding to the leaf node is obtained, the new next node being adjacent to the new input node in the sequence of all nodes.

19. The computer-implemented system according to claim 15, comprising:

receiving a data decryption request from a data decryption device, wherein the data decryption request comprises the data identifier;

calculating the data-specific key based on the prestored root key and the data identifier by using the one-way function; and sending the data-specific key to the data decryption device, wherein the data decryption device decrypts the encrypted data corresponding to the data identifier based on the data-specific key.

20. The computer-implemented system according to claim 19, wherein the encrypted data corresponds to a leaf node of the predetermined tree structure.

\* \* \* \* \*